(12) United States Patent
Goto (10) Patent No.: US 8,152,320 B2
(45) Date of Patent: Apr. 10, 2012

(54) SURFACE LIGHT SOURCE DEVICE

(75) Inventor: Masahiro Goto, Mihara (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 636 days.

(21) Appl. No.: 11/994,015

(22) PCT Filed: Jun. 30, 2006

(86) PCT No.: PCT/JP2006/313119
§ 371 (c)(1), (2), (4) Date: Feb. 12, 2008

(87) PCT Pub. No.: WO2007/004573
PCT Pub. Date: Jan. 11, 2007

(65) Prior Publication Data
US 2009/0201665 A1   Aug. 13, 2009

(30) Foreign Application Priority Data

Jul. 1, 2005 (JP) ................................ 2005-193886

(51) Int. Cl.
*G09F 13/04* (2006.01)
*F21S 8/00* (2006.01)
(52) U.S. Cl. ....... 362/97.3; 362/237; 362/244; 362/268; 362/311.02; 362/311.08
(58) Field of Classification Search ........ 362/97.1–97.3, 362/268, 311.01–311.02, 311.06–311.08, 362/339, 235–237, 244
See application file for complete search history.

(56) References Cited

U.S. PATENT DOCUMENTS

| 5,592,332 | A | | 1/1997 | Nishio et al. |
| 5,944,405 | A | * | 8/1999 | Takeuchi et al. .............. 362/617 |
| 6,130,777 | A | * | 10/2000 | Yamashita et al. ............ 359/456 |
| 7,237,930 | B2 | * | 7/2007 | Onishi et al. .................. 362/333 |
| 2005/0073495 | A1 | | 4/2005 | Harbers et al. |
| 2005/0117318 | A1 | | 6/2005 | Tenmyo |
| 2006/0087866 | A1 | * | 4/2006 | Ng et al. ....................... 362/612 |

FOREIGN PATENT DOCUMENTS

| JP | 05-119703 | 5/1993 |
| JP | 06-301035 | 10/1994 |
| JP | 08-015780 | 1/1996 |
| JP | 11-242219 | 9/1999 |
| JP | 2005-115372 | 4/2005 |
| JP | 2005-166280 | 6/2005 |
| JP | 2006-140124 | 6/2006 |

* cited by examiner

*Primary Examiner* — Diane Lee
*Assistant Examiner* — Sean Gramling
(74) *Attorney, Agent, or Firm* — Burr & Brown (57) ABSTRACT

A surface light source device including a light source unit having a plurality of light-emitting sources in a two-dimensional direction, and a lenticular lens sheet having a plurality of unit lenses, each of which is a part of a substantially elliptic cylinder, such that lens surfaces of the unit lenses face a light emergent side. There is a particular relationship between an interval at which the light-emitting sources are arranged in the same direction as an arrangement direction of the unit lenses, an interval between the light emitting sources and a rear surface of the lenticular lens sheet, a unit-lens end-portion angle, and the refractive index of the material of the lens sheet.

8 Claims, 6 Drawing Sheets

SURFACE LIGHT SOURCE DEVICE

FIELD OF THE INVENTION

The present invention relates to a surface light source device that illuminates a liquid crystal display or the like.

BACKGROUND OF THE INVENTION

A variety of surface light source devices that are used to illuminate a transmission type of liquid crystal displays or the like from their rear have been proposed and put into practical use. Such surface light source devices are broadly classified into the edge light type and the direct type. These types differ from each other in the mode of conversion of a non-surface light source to a surface light source.

For example, a surface light source device of the direct type is so constructed that light is introduced from its rear by cold-cathode tubes arranged in parallel. The cold-cathode tubes and a transmission type of display element such as an LCD (Liquid Crystal Display) panel are properly spaced from each other. In this space, there are placed a diffusing sheet and a combination of two or more sheets capable of converging light.

Such a conventional surface light source device is poor in the light-converging properties, although the number of required optical sheets is large. Thus, the LCD panel has been improved for compensating the light-converging properties, so that even light that is obliquely incident can produce an image of excellent qualities.

However, this improvement suffers reduction in optical efficiency, and complicates the structure of the LCD panel, which results in increase in cost.

In particular, the light intensity (luminance) tends to be non-uniform (luminance non-uniformity tends to occur) depending on the distance from the cold-cathode tubes (i.e., whether that point is close to a certain cold-cathode tube or to a space between the cold-cathode tubes arranged in parallel). A possible method of avoiding the non-uniformity is to space the cold-cathode tubes and the LCD panel sufficiently apart from each other. However, this method undesirably increases a thickness of the display. Another possible method of avoiding the non-uniformity is to intense diffusion or to control an amount of transmitting light. However, this method disadvantageously degrades the optical efficiency.

For example, JP-A-5-119703 and JP-A-11-242219 can be raised as background art documents. In the surface light source devices disclosed in these documents, uniformity of light intensity (luminance) is maintained by providing a light-shielding member (lighting curtain, light-shielding dot layer). However, this method is disadvantageous in that the optical efficiency is lowered, similar to the above-described method.

JP-A-2005-115372 discloses that, in place of the cold-cathode tubes, independent light-emitting diodes (LED) of point light sources of red, green, and blue, which are the three primary colors of light, are used as light-emitting sources.

However, the use of arranged LEDs of independently different luminescent colors may invite color non-uniformity, in addition to the luminance non-uniformity as described above.

Moreover, since an LED is substantially a point light source, the luminance non-uniformity is likely to occur in a two-dimensional direction, as compared with a cold-cathode tube.

SUMMARY OF THE INVENTION

The object of the present invention is to provide a surface light source device with less luminance non-uniformity and less color non-uniformity.

Based on researches and examinations to realize a surface light source device with less luminance non-uniformity and less color non-uniformity by means of substantially point light sources, the inventors of the present invention have found optimum conditions about a shape of a lenticular lens sheet and a positional relationship of the lenticular lens sheet relative to light-emitting sources.

The present invention achieves the above object by the following features. Note that, although the embodiments of the present invention will be described referring to the reference numbers in order to facilitate understanding, the present invention should not be limited to the specific understanding on the ground of the reference numbers.

The present invention is a surface light source device (17) comprising: a light source unit (18) structured by arranging a plurality of light-emitting sources (13, 13R, 13G, 13B) that are substantially point light sources in a two-dimensional direction; and a lenticular lens sheet (14-1) structured by arranging a plurality of unit lenses (141-1) of one type or of various types, each of which is a part of a substantially elliptic cylinder, such that lens surfaces of the unit lenses face a light emergent side; wherein, when an interval at which the light-emitting sources are arranged in the same direction as an arrangement direction of the unit lenses of the lenticular lens sheet is defined as L, an interval between the light emitting sources and a rear surface of the lenticular lens sheet is defined as d, a unit-lens end-portion angle that is an angle between: a contact surface with respect to the lens surface of the unit lens at a trough between the unit lenses adjacent to each other of the lenticular lens sheet; and a normal line of the lenticular lens sheet is defined as $\theta$, and a refractive index of a material forming the unit lenses of the lenticular lens sheet is defined as n, relationships of: $\cos^{-1}(n \times \cos(\phi+\theta)) \leq \theta$; and $\phi = \sin^{-1}(\sin(\tan^{-1}(L/2d))/n)$; or relationships of: $n \times \cos(\phi+\theta) > 1$; and $\phi = \sin^{-1}(\sin(\tan^{-1}(L/2d))/n)$; are satisfied.

According to the present invention, by satisfying the above relational formulas, generation of luminance non-uniformity can be effectively prevented, although the light-emitting sources are point light sources.

Preferably, the surface light source device further comprises a second lenticular lens sheet (14-2) structured by arranging a plurality of unit lenses of one type or of various types, each of which is a part of a substantially elliptic cylinder, such that convex surfaces of the unit lenses face the light emergent side, wherein the second lenticular lens sheet (14-2) is disposed on the lenticular lens sheet (14-1) in a stacking manner, an arrangement direction in which the unit lenses of the second lenticular lens sheet are arranged is perpendicular to the arrangement direction in which the unit lenses of the lenticular lens sheet (14-1) are arranged, and when an interval at which the light-emitting sources are arranged in the same direction as the arrangement direction of the unit lenses of the second lenticular lens sheet is defined as L', an interval between the light emitting sources and a rear surface of the second lenticular lens sheet is defined as d', a unit-lens end-portion angle that is an angle between: a contact surface with respect to the lens surface of the unit lens at a trough between the unit lenses adjacent to each other of the second lenticular lens sheet; and a normal line of the second lenticular lens sheet is defined as $\theta'$, and a refractive index of a material forming the unit lenses of the second lenticular lens sheet is defined as n', relationships of: $\cos^{-1}(n' \times \cos(\phi'+\theta')) \leq \theta'$; and $\phi' = \sin^{-1}(\sin(\tan^{-1}(L'/2d'))/n')$; or relationships of: $n' \times \cos(\phi'+\theta') > 1$; and $\phi' = \sin^{-1}(\sin(\tan^{-1}(L'/2d'))/n')$; are satisfied.

In this case, although the light-emitting sources are point light sources, generation of luminance non-uniformity can be effectively prevented in the two directions that are perpendicular to each other.

In addition, preferably, the light source unit (18) is structured by arranging a plurality of light-emitting sources (13R, 13G, 13B) of various types, which are substantially point light sources of different luminescent colors, in a two-dimensional direction in a predetermined order, and when a largest interval out of intervals at which the light-emitting sources of the same type are arranged, in the same direction as the arrangement direction of the unit lenses of the lenticular lens sheet (14-1) is defined as $L_c$, relationships of: $\cos^{-1}(n \times \cos(\phi''+\theta)) \leq \theta$; and $\phi''=\sin^{-1}(\sin(\tan^{-1}(L_c/2d))/n)$; or relationships of: $n \times \cos(\phi''+\theta) > 1$; and $\phi''=\sin^{-1}(\sin(\tan^{-1}(L_c/2d))/n)$; are satisfied.

In this case, although the various types of light-emitting sources of different luminescent colors are used, not only generation of luminance non-uniformity but also generation of color non-uniformity can be effectively prevented. Thus, any coloring can be optionally adjusted, whereby an excellent surface light source free of luminance non-uniformity and color non-uniformity can be realized.

In addition, preferably, the light-emitting sources (13R, 13G, 13B) are light-emitting diodes. The light-emitting diode is excellent in color reproducibility and has a long duration of life. Further, the light-emitting diode is advantageous in that no mercury is used therein. In particular, it is most efficient to use the light-emitting diodes of three colors of R, G, and B. Even in this case, generation of color non-uniformity can be sufficiently prevented.

In addition, preferably, a reflective layer (12) having a diffusion function is formed in the light source unit (18) at least at a position of the intervals between the light-emitting sources.

In this case, the reflective layer diffuses and reflects light that has been reflected and returned from the lenticular lens sheet (14-1, 14-2), whereby the light can again enter the lenticular lens sheet (14-1, 14-2) at a different incident angle and at a different incident position. Therefore, the function of reducing the luminance non-uniformity and the color non-uniformity can be further improved.

In addition, preferably, a reflectivity with respect to light vertically incident on the lenticular lens sheet (14-1, 14-2) is not less than 40%. In this case, the effect of reducing the luminance non-uniformity and the color non-uniformity can be further improved.

In addition, preferably, particles having a reflection effect is added to the lenticular lens sheet (14-1, 14-2). Alternatively, the lens surface of the lenticular lens sheet (14-1, 14-2) is covered with particles having a reflection effect. In theses cases, a desired reflectivity can be easily attained, and thus it is easy to set a degree of the luminance non-uniformity preventing effect and a degree of the color non-uniformity preventing effect.

DETAILED DESCRIPTION OF THE INVENTION

Embodiments of the present invention will be described in detail below with reference to the accompanying drawings. The drawings are diagrammatic views, and the dimensions and shapes of respective parts shown in the drawings are exaggerated in order to facilitate understanding.

First Embodiment

Figure 1:
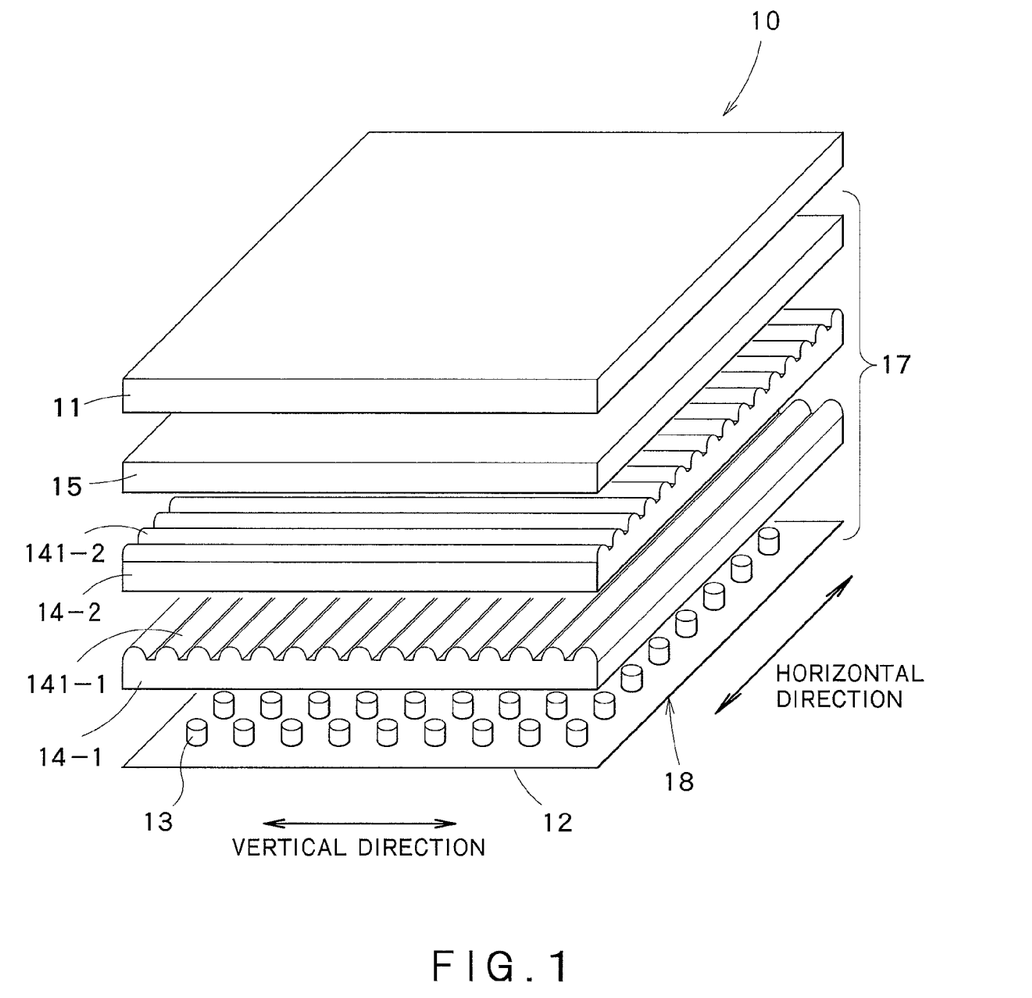
FIG. 1 is an exploded perspective view of a transmission-type display device including a surface light source device according to a first embodiment of the present invention.

FIG. 1 is an exploded perspective view of a transmission-type display device including a surface light source device according to a first embodiment of the present invention. As shown in FIG. 1, the transmission type display device 10 comprises an LCD panel 11, a reflector 12, light-emitting sources 13, a lenticular lens sheet 14-1, a second lenticular lens sheet 14-2, and a reflective polarization sheet 15. The transmission-type liquid crystal display device 10 is a device that illuminates the LCD panel 11 from its rear to display image information produced on the LCD panel 11. A surface light source device 17 for illuminating the LCD panel 11 from its rear is formed by the reflector 12, the light-emitting sources 13, the lenticular lens sheet 14-1, the second lenticular lens sheet 14-2, and the reflective polarization sheet 15.

The LCD panel 11 is composed of liquid crystal display elements of so-called transmission type. The LCD panel 11 is 30 inches in size, and is so constructed that it can attain 800×600 dot matrix display.

The light-emitting sources 13 in this embodiment are point light sources, which constitute a light source unit serving as a backlight. Specifically, each light-emitting source 13 in this embodiment is made of a white-light emitting diode as a point light source that emits substantially white light. The light-emitting sources 13 are arranged in the form of a grid in a two-dimensional direction with an interval L=50 mm therebetween.

The reflector 12 is disposed on the rear of the light-emitting sources 13. The reflector 12 spreads all over the surfaces of the respective light-emitting sources 13 on the opposite (rear) side to the lenticular lens sheet 14-1, so as to support the respective light-emitting sources 13. The reflector 12 has a function of diffusing and reflecting an illumination light that has traveled rearward from the respective light-emitting sources 13, so as to cause the illumination light to travel toward the lenticular lens sheet 14-1 (in the direction in which the light should emerge). Owing to this function of the reflector 12, luminous intensity of the incident light can be made substantially uniform.

The reflective polarization sheet 15 is a polarized-light separating sheet capable of enhancing luminance without narrowing a view angle, and is placed between the LCD panel 11 and the second lenticular lens sheet 14-2. In this embodiment, DBEF (manufactured by Sumitomo 3M Limited, Japan) is used as the reflective polarization sheet 15.

Figure 2:
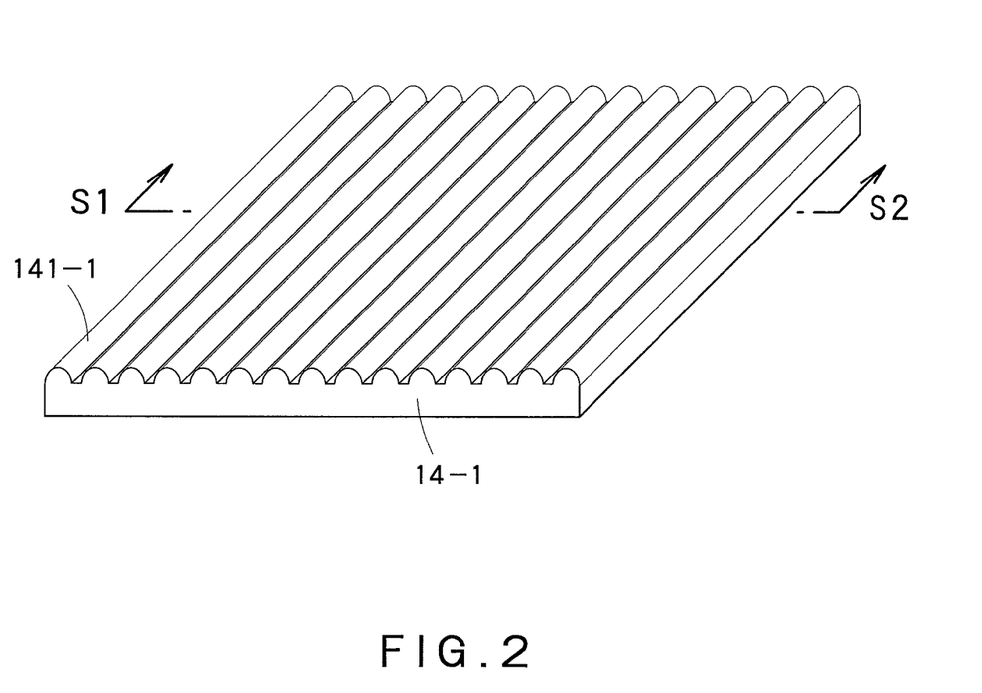
FIG. 2 is a perspective view of a structural example of a lenticular lens sheet.

FIG. 2 is a perspective view of the lenticular lens sheet 14-1. As shown in FIG. 2, in order that luminance non-uniformity of the light that has emerged from the light-emitting sources 13 is reduced to make uniform luminance of the light, the lenticular lens sheet 14-1 has unit lenses (lens surfaces) 141-1 on a light emergent side thereof, for converging and emitting the light. Each unit lens 141-1 has a shape corresponding to a part of an elliptic cylinder. The plurality of such unit lenses 141-1 are arranged in parallel on a surface of the lenticular lens sheet 14-1 from which the light emerges, so as to constitute a lenticular lens surface. In this embodiment, the direction in which the unit lenses 141-1 are arranged is the vertical direction of the screen.

The lenticular lens sheet 14-1 in this embodiment is formed by extruding a transparent PMMA resin (acryl resin) with a refractive index of 1.49. However, not limited to the PMMA, another thermoplastic resin with light-transmitting properties may be suitably, selectively used. Alternatively, with the use of a UV cured resin, the lenticular lens sheet 14-1 may be manufactured by a method called UV molding.

Figure 3:
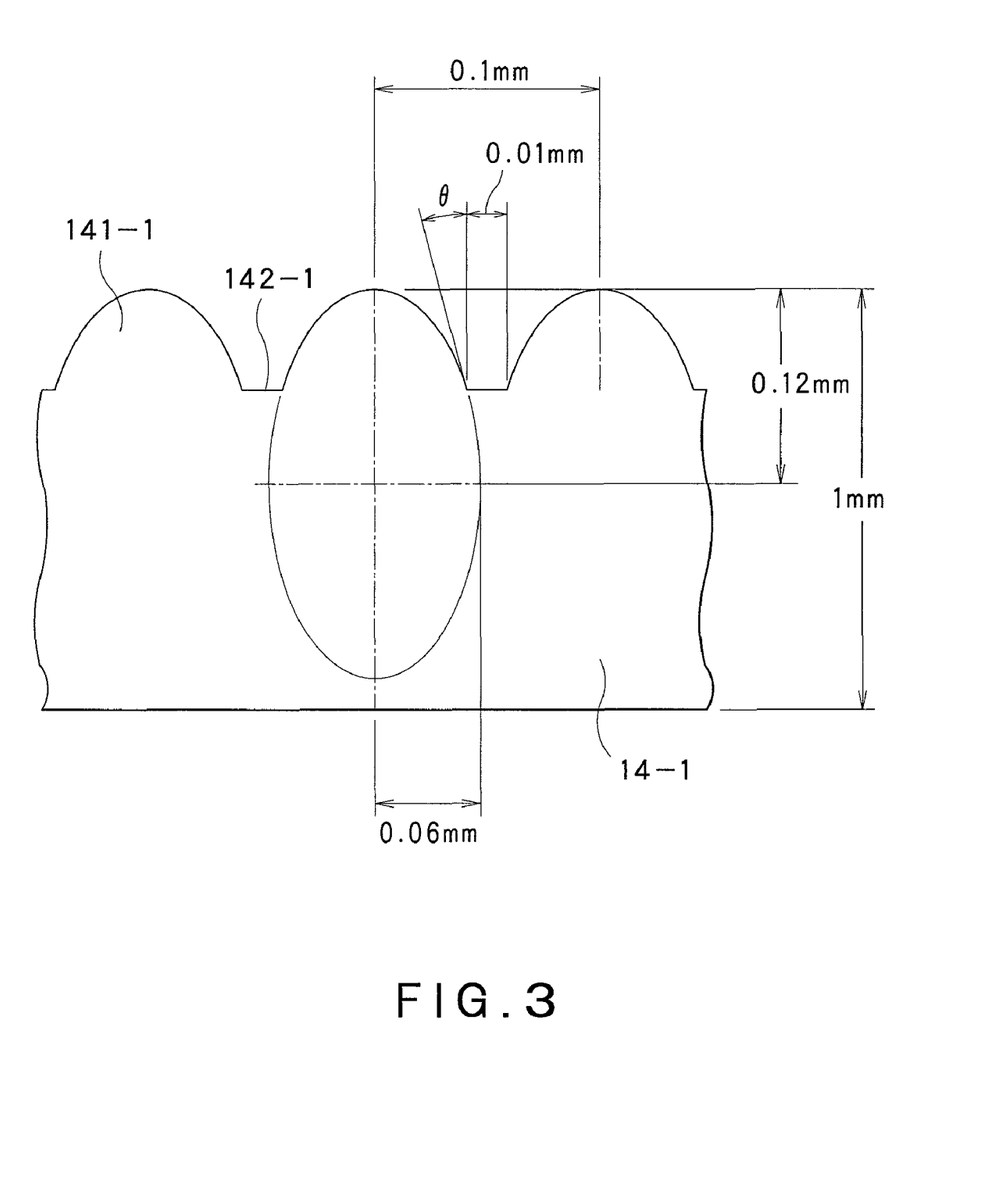
FIG. 3 is a longitudinal sectional view of the lenticular lens sheet shown in FIG. 2 taken along the line S1-S2.

FIG. 3 is a longitudinal sectional view of the lenticular lens sheet 14-1 shown in FIG. 2 taken along the line S1-S2.

As illustrated in FIG. 3, the cross section of each unit lens 141-1 forms a part of an ellipse with a semi-major axis of 0.12 mm and a semi-minor axis of 0.06 mm. A major axis of the ellipse is perpendicular to the sheet face of the lenticular lens sheet 14-1. The unit lenses 141-1 are arranged with a pitch of 0.1 mm. A total thickness of the lenticular lens sheet 141-1 is 1 mm. A flat part 142-1 is formed between the unit lenses 141-1. The flat part 142-1 is 0.01 mm in width.

When the unit lenses 141-1 are formed (arranged) in compliance with the above dimensions, an angle between: a contact surface with respect to the lens surface of each unit lens 141-1 at a contact point to the flat part 142-1 between the unit lenses 141-1 adjacent to each other; and a normal line of the lenticular lens sheet 14-1, i.e., a unit-lens end-portion angle θ is 30°.

The lenticular lens sheet 14-1 reflects 50% of the light that has vertically entered the lenticular lens sheet 14-1 to return the same, by the lens surfaces of the unit lenses 141-1. This prevents that areas just above the light-emitting sources 13 become too bright. In addition, the reflected and returned light is diffused and reflected by the reflector 12, and again enters the lenticular lens sheet 14-1 at a position apart from the light-emitting source 13. Thus, an effect of reducing the luminance non-uniformity can be also provided.

In order to sufficiently obtain the effect of preventing the generation of luminance non-uniformity, it is preferable that a reflectivity of the lenticular lens sheet 14-1 with respect to light vertically incident on the lenticular lens sheet 14-1 is not less than 40%.

Figure 4:
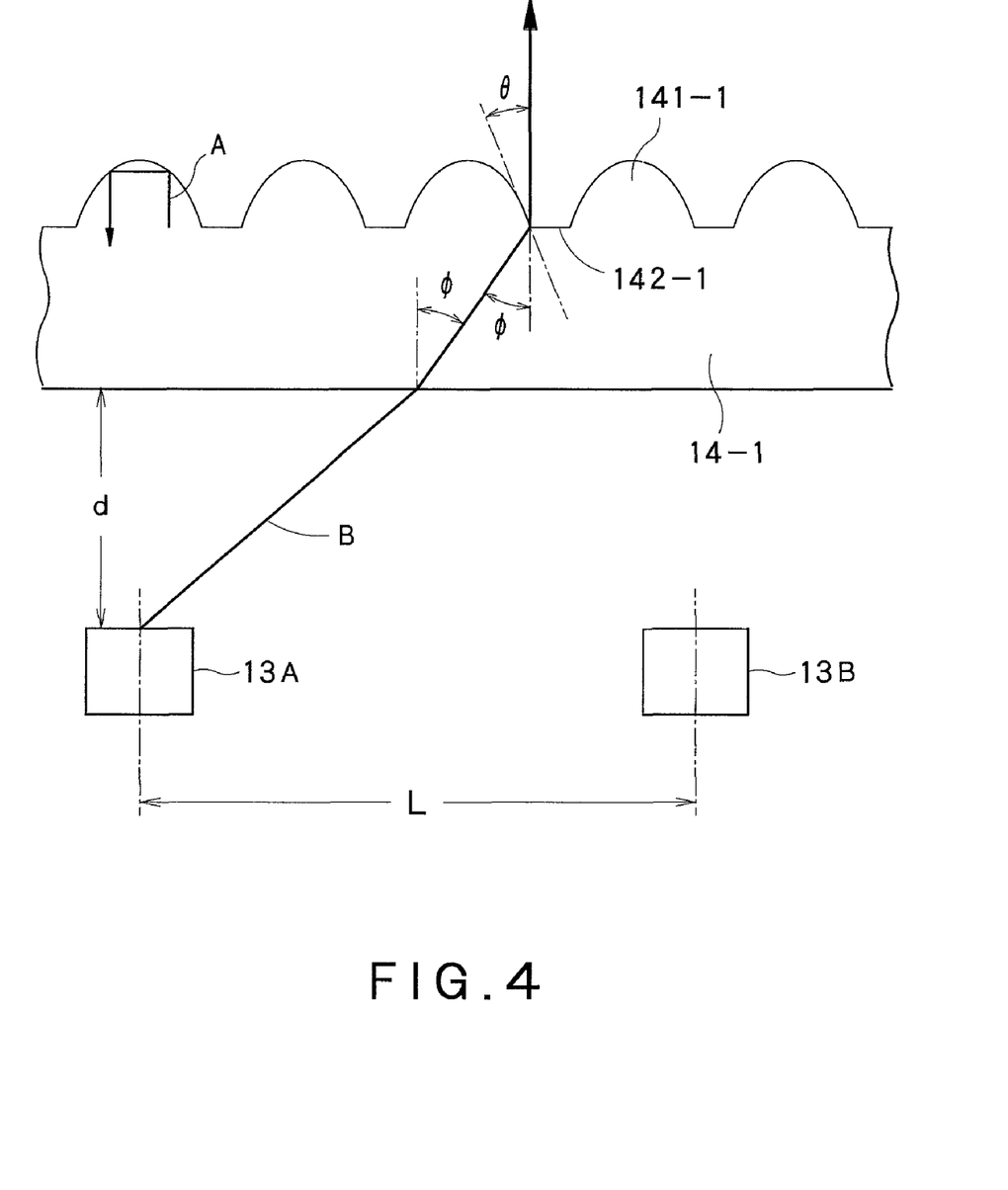
FIG. 4 is a sectional view showing a way of traveling of a light incident on the lenticular lens sheet shown in FIG. 2.

FIG. 4 is a sectional view showing a way of traveling of a light incident on the lenticular lens sheet 14-1 shown in FIG. 2.

The luminance non-uniformity on the surface light source device is generally caused by the fact that the area just above a light-emitting source 13 is bright, while another position apart from the light-emitting source 13, i.e., the area just above an intermediate position between the light-emitting sources 13 adjacent to each other, is dark. Thus, each unit lens 141-1 of the lenticular lens sheet 14-1 has a function of totally reflecting light substantially vertically incident on the lenticular lens sheet 14-1 in the area just above the light-emitting source 13 to return the light toward the light source side (see, light ray A in FIG. 4). Thus, it can be prevented that the area just above the light-emitting source 13 becomes too bright.

However, the luminance non-uniformity cannot be fully prevented by the above function of the unit lenticular lenses 141-1. In order to completely prevent the luminance non-uniformity, it is necessary to efficiently refract light, which has reached the area just above the intermediate position between the light-emitting sources 13 adjacent to each other, in a direction close to the front direction (in which the light emerges at an angle of 0°), so as to increase (an amount of) light that emerges from the area just above the intermediate position to reach the observer.

If the illumination light, which has reached the unit lens 141-1 at a position extremely close to the flat part 142-1, emerges therefrom substantially in a direction of the normal line, it can be said that an effect of correcting the luminance non-uniformity (an effect of uniformizing the luminance non-uniformity) is achieved very well. However, when light is incident on the unit lens 141-1 at an angle larger than a certain angle of a threshold value, an amount of light emergent therefrom substantially in the normal direction is abruptly, severely decreased, and this results in a spot which seems dark (the spot is referred to as "dark spot"). Whether such a dark spot is observed or not depends on a relationship between an angle of the lens surface at the end portion of the unit lens (unit-lens end-portion angle) and an angle of incidence of the illumination light. The angle of incident is determined depending on a positional relationship between the light-emitting sources 13 and the lenticular lens sheet 14-1. Out of light rays that directly reach the lenticular lens sheet 14-1 from the light-emitting sources 13, a light ray incident on the lenticular lens sheet 14-1 at the largest angle is a light ray incident on the area just above the intermediate position between the light-emitting sources 13.

Therefore, in this embodiment, taking account of the unit-lens end-portion angle θ and the positional relationship between the light emitting sources 13 and the lenticular lens sheet 14-1, which have a large impact on prevention of generation of luminance non-uniformity, conditions thereof required to prevent the luminance non-uniformity have been determined.

At first, an interval at which the light-emitting source 13A and the light-emitting source 13B are arranged is defined as L, and a distance between the light-emitting sources 13A and 13B and the lenticular lens sheet 14-1 is defined as d. As shown in FIG. 4, there is examined a light ray B that travels from the certain light-emitting source 13A at an angle from the direction toward the adjacent light-emitting source 13B, and that directly enters the lenticular lens sheet 14-1.

Figure 7:
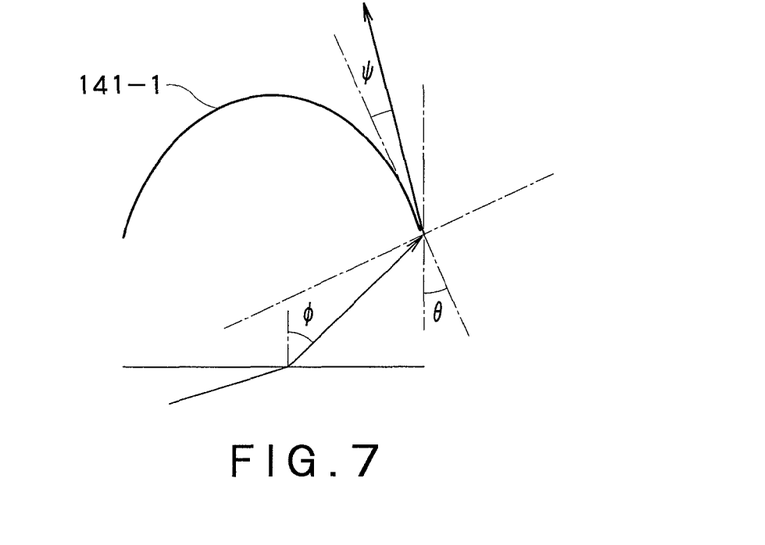
FIG. 7 is an additional sectional view showing the way of traveling of the light incident on the lenticular lens sheet shown in FIG. 2.

A case is considered in which the light ray B is incident on a position that is 50% the distance between the light-emitting source 13A and the light-emitting source 13B, i.e., on an intermediate position therebetween. If the light ray B reaches the end portion of the unit lens and then emerges therefrom substantially in the normal direction or in a direction closer to the unit lens than the normal direction, a satisfactory effect of correcting the luminance non-uniformity can be expected. In more detail, as shown in FIG. 7, when an angle between a lens tangent line and the light ray B is defined as ψ, the following formula (0) is obtained by the Snell's law.

$$n \times \sin(90° - (\phi + \theta)) = \sin(90° - \psi) \qquad \text{formula (0)}$$

Herein, n denotes a refractive index of a material forming the lenticular lens 141-1, and φ denotes a refractive angle at which the light ray B is incident on the lenticular lens sheet 14-1. Since $\sin(90° - (\phi + \theta)) = \cos(\phi + \theta)$, the formula (0) can be settled as follows.

$$\cos^{-1} = (n \times \cos(\phi + \theta)) = \psi \qquad \text{formula (0')}$$

When ψ is not more than θ, the light ray B incident on the unit lens 141-1 emerges from the end portion of the unit lens substantially in the normal direction of the lenticular lens sheet 14-1 or in the direction closer to the unit lens than the normal direction. Thus, the light emergent from the unit lens 141-1 has a component of light emergent in substantially the vertical direction, so that a satisfactory effect of correcting the luminance non-uniformity can be expected. By mathematizing these relationships, the following formulas (1) and (2) can be obtained.

$$\cos^{-1}(n \times \cos(\phi+\theta)) \leq \theta \qquad \text{formula (1)}$$

$$\phi = \sin^{-1}(\sin(\tan^{-1}(L/2d))/n) \qquad \text{formula (2)}$$

The parameters in this embodiment are L=50 mm, d=40 mm, and n=1.49. Thus, φ=21° is derived. Further, since θ=30°, the above formulas (1) and (2) are satisfied.

Referring again to FIG. 1, the second lenticular lens sheet 14-2 is described. The structure of the second lenticular lens sheet 14-2 is substantially the same as that of the lenticular lens sheet 14-1. For example, the shape of each unit lens 141-2 formed on a light emergent side of the second lenticular lens sheet 14-2 is identical to the shape of the unit lens 141-1 of the lenticular lens sheet 14-1. It is noted that the lenticular lens sheets 14-1 and 14-2 are disposed in a stacking manner such that the direction in which the unit lenses 141-2 of the second lenticular lens sheet 14-2 are arranged is perpendicular to the direction in which the unit lenses 141-1 of the lenticular lens sheet 14-1 are arranged.

A distance d' between the light emitting sources 13 and the second lenticular lens sheet 14-2 is larger than the distance d between the light emitting sources 13 and the lenticular lens sheet 14-1. To be specific, d'=41 mm. However, the other parameters relevant to the second lenticular lens sheet 14-2 are the same as the parameters relevant to the lenticular lens sheet 14-1. Namely, an interval L' at which the light-emitting sources are arranged in the same direction as the arrangement direction of the unit lenses 141-2 of the second lenticular lens sheet 14-2 corresponds to the interval L. In addition, as described above, a unit-lens end-portion angle θ' of the second lenticular lens sheet 14-2 corresponds to the unit-lens end-portion angle θ, and a refractive index n' of a material forming the unit lenses 141-2 of the second lenticular lens sheet 14-2 corresponds to the refractive index n. In this embodiment, the following formulas (3) and (4) are satisfied.

$$\cos^{-1}(n' \times \cos(\phi'+\theta')) \leq \theta' \qquad \text{formula (3)}$$

$$\phi' = \sin^{-1}(\sin(\tan^{-1}(L'/2d'))/n') \qquad \text{formula (4)}$$

Due to this arrangement, the light can be converged in the two directions perpendicular to each other, and an effect of reducing the luminance non-uniformity can be attained not only in the vertical direction but also in the horizontal direction.

As described above, according to this embodiment, since the lenticular lens sheets 14-1 and 14-2 satisfy the formulas (1) to (4), light that has reached the area just above the intermediate position between the light-emitting sources 13 can efficiently emerge in a direction close to the front direction (in which the light emerges at an angle of 0°), so that it is possible to increase an amount of light that emerges from the area just above the intermediate position between the light-emitting sources 13 to reach the observer. Therefore, uniform illumination light free of the luminance non-uniformity can be directed toward the observer with an improved optical efficiency.

The lenticular lens sheet 14-1 and the second lenticular lens sheet 14-2 are arranged such that the unit lenses 141-1 of the former and the unit lenses 141-2 of the latter are perpendicular to each other. Thus, the light can be controlled both in the horizontal direction and in the vertical direction, whereby an effect of restraining the luminance non-uniformity can be further elevated, while a front luminance can be enhanced.

In this embodiment, a sheet of the same shape as that of the lenticular lens sheet 14-1 is used as the second lenticular lens sheet 14-2. However, not limited thereto, any other sheet that is totally different from the lenticular lens sheet 14-1 in shape and/or material, for example, may be placed as the second lenticular lens sheet 14-2.

Second Embodiment

Figure 5:
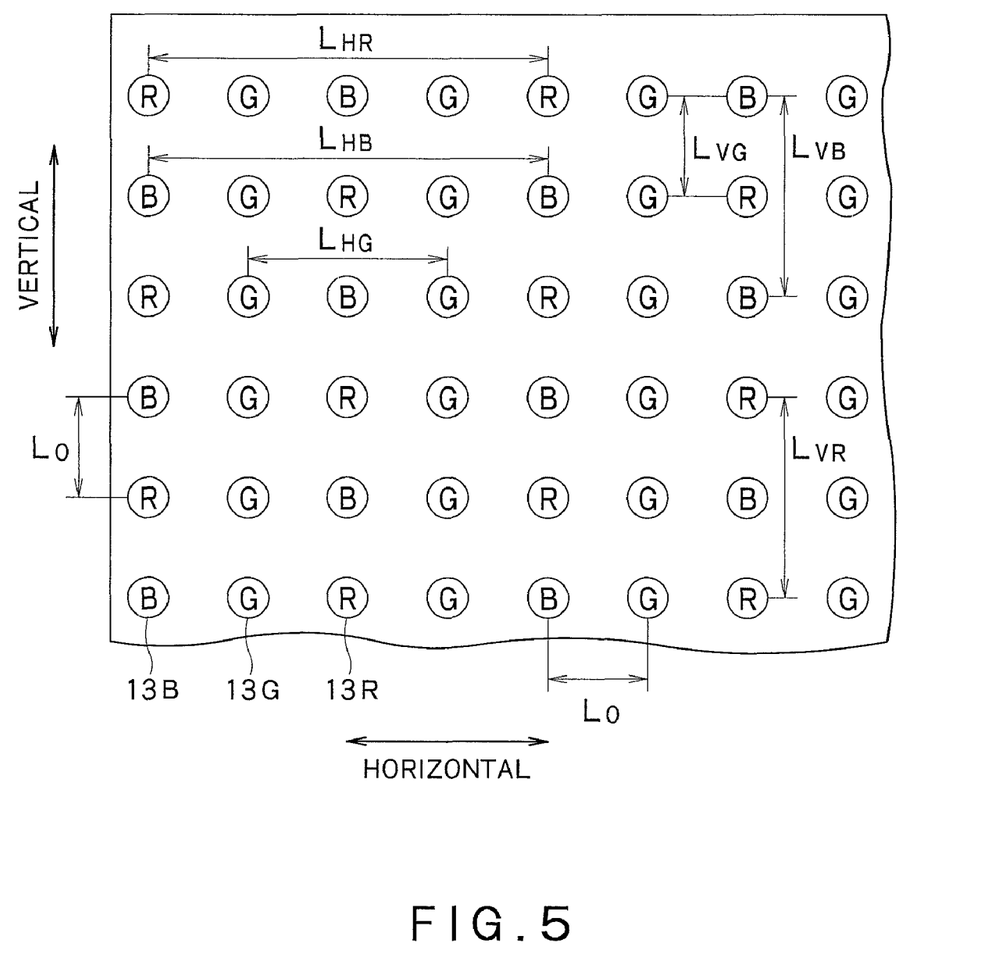
FIG. 5 is a view of light-emitting sources of a surface light source device according to a second embodiment of the present invention, when viewed from the observation side.

FIG. 5 is a view of light-emitting sources of a surface light source device according to a second embodiment of the present invention, when viewed from the observation side.

Although this embodiment differs from the first embodiment as to a light source unit 18', the other structures of this embodiment are substantially the same as those of the first embodiment. The same parts as those of the first embodiment are indicated by the same reference numbers, and their detailed description is omitted.

The light source unit 18' in this embodiment is composed of three types of light emitting sources of different luminescent colors, which are arranged in a two-dimensional direction in a predetermined regular order. The three types of light emitting sources are classified into blue-light emitting sources 13B for emitting blue light, green-light emitting sources 13G for emitting green light, and red-light emitting sources 13R for emitting red light. These light-emitting sources 13B, 13G, and 13R are arranged in the following order. Namely, there are arranged, from the left in the horizontal direction in FIG. 5, the red-light emitting source 13R, the green-light emitting source 13G, the blue-light emitting source 13B, the green-light emitting source 13G, the red-light emitting source 13R . . . . With respect to columns (vertical direction), the blue-light emitting source 13B is arranged vertically below (lower direction in FIG. 5) the red-light emitting source 13R, the red-light emitting source 13R is arranged below the blue-light emitting source 13B, and the green-light emitting source 13G is arranged below the green-light emitting source 13G. An interval $L_0$ at which the respective light-emitting sources 13B, 13G, and 13R are arranged is 12.5 mm both in the horizontal and in the vertical direction.

Thus, in the horizontal direction, an interval $L_{HR}$ at which the red-light emitting sources 13R emitting the same color light are arranged is 50 mm, which is obtained by multiplying the $L_0$ by 4. An interval $L_{HG}$ at which the green-light emitting sources 13G are arranged is 25 mm, which is obtained by multiplying the $L_0$ by 2. An interval $L_{HB}$ at which the blue-light emitting sources 13B are arranged is 50 mm, which is obtained by multiplying the $L_0$ by 4. Similarly, in the vertical direction, an interval $L_{VR}$ at which the red-light emitting sources 13R emitting the same color light are arranged is 25 mm, which is obtained by multiplying the $L_0$ by 2. An interval $L_{VG}$ at which the green-light emitting sources 13G are arranged is 12.5 mm, which equals to the $L_0$. An interval $L_{VB}$ at which the blue-light emitting sources 13B are arranged is 25 mm, which is obtained by multiplying the $L_0$ by 2.

It should be noted that the above arrangement of the respective light-emitting sources 13B, 13G, and 13R is merely an example, and another arrangement and/or order may be employed.

In the first embodiment, a white-light emitting diode is used as the light-emitting source 13. By satisfying the formulas (1) and (2), prevention of the luminance non-uniformity can be successfully achieved. On the other hand, in the second embodiment, the light-emitting sources 13B, 13G, and 13R respectively emit light of different colors. Thus, even when the formulas (1) and (2) are satisfied with the use of the shortest interval $L_0$ among the intervals at which the respective light-emitting sources are arranged, there is a possibility that the color non-uniformity is generated. This is because, as to the light-emitting sources emitting the same color light, the interval therebetween is larger than the interval $L_0$.

Therefore, in this embodiment, by defining as Lc the largest interval out of the intervals at which the light-emitting sources emitting the same color light are arranged, conditions satisfying the following formulas (5) and (6) are employed.

$$\cos^{-1}(n \times \cos(\phi+\theta)) \leq \theta \qquad \text{formula (5)}$$

$$\phi = \sin^{-1}(\sin(\tan^{-1}(Lc/2d))/n) \qquad \text{formula (6)}$$

Figure 6:
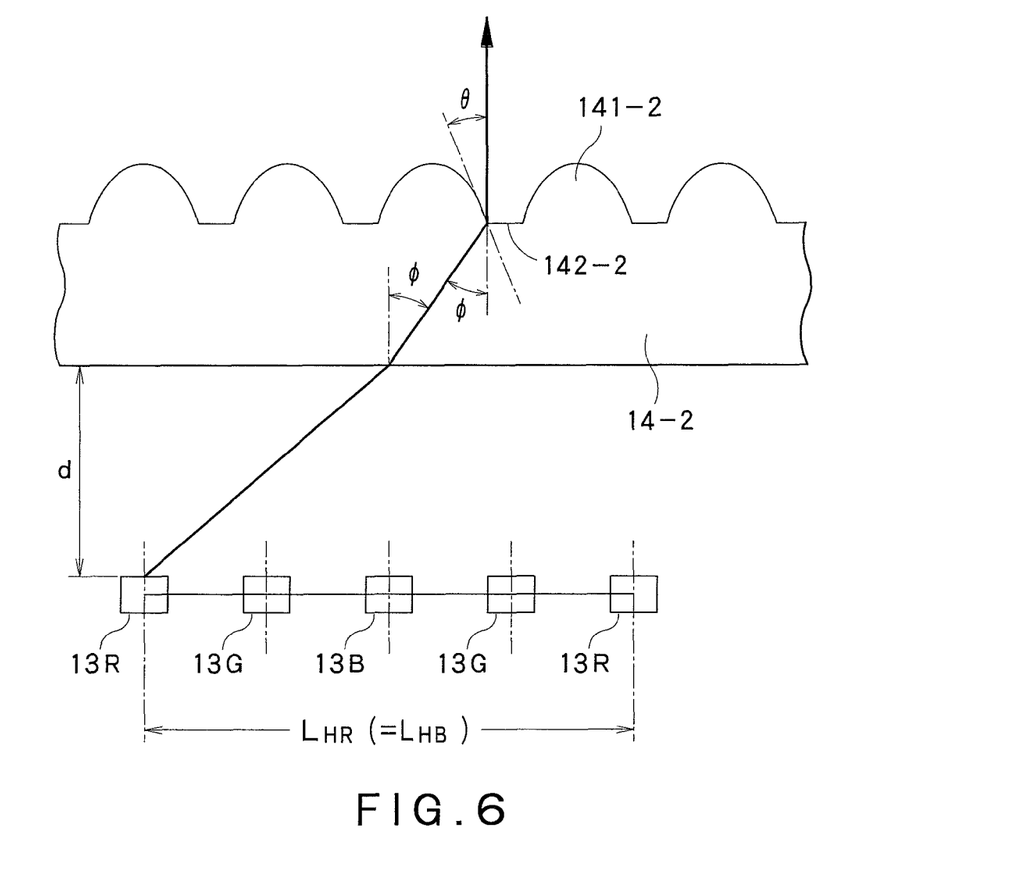
FIG. 6 is a view showing a way of traveling of a light incident on a second lenticular lens sheet shown in FIG. 5.

FIG. 6 is a view showing a way of traveling of a light incident on a second lenticular lens sheet shown in FIG. 5.

Placed between the respective light-emitting sources 13R, 13G, and 13B, and a lenticular lens sheet 14-2 is a lenticular lens sheet 14-1. However, since the lenticular lens sheet 14-1 does not have a remarkable polarizing function with respect to light traveling in the horizontal direction, it is sufficient that only the second lenticular lens sheet 14-2 is examined. In this embodiment, when the formulas (3) and (4) are satisfied in which a positional relationship between the respective light-emitting sources 13R, 13G, and 13B, and the second lenticular lens sheet 14-2 is $L'=Lc=L_{HR}=L_{HB}$, the color non-uniformity and the luminance non-uniformity in the horizontal direction can be prevented.

To be specific, the parameters are $L'=50$ mm, $d'=41$ mm, and $n'=n=1.49$. Thus, $\phi'=20°$ and $\theta'=\theta=30°$. Therefore, this embodiment can satisfy the formulas (3) and (4), whereby the color non-uniformity and the luminance non-uniformity in the horizontal direction can be prevented.

On the other hand, when a positional relationship between the respective light-emitting sources 13R, 13G, and 13B, and the lenticular lens sheet 14-1, satisfies the formulas (5) and (6) in which $Lc=L_{VR}=L_{VB}$, the color non-uniformity and the luminance non-uniformity in the vertical direction can be prevented.

To be specific, the parameters are $Lc=25$ mm, $d=40$ mm, and $n=1.49$. Thus, $\phi=12°$ and $\theta=30°$. When these values are substituted into the formula (5), the value of $(n \times \cos(\phi+\theta))$ equals not less than 1, and thus the computation is impossible. That is, the formulas (5) and (6) are not satisfied. However, in this case, light is totally reflected by the unit lens 141-1. In addition, at a part of the lens surface that is inclined at an angle smaller than an angle of a threshold value for the total reflection, light emits at an angle (direction) close to the normal line of the lenticular lens sheet 14-1. As a result, an effect of preventing the color non-uniformity and the luminance non-uniformity can be obtained. In other words, there can be obtained an effect equivalent to the effect which can be provided when the formulas (5) and (6) are satisfied.

According to this embodiment, since the light-emitting diodes of different luminescent colors are used for the light source unit, coloring can be minutely adjusted. Meanwhile, even in such a light source unit, generation of color non-uniformity and luminance non-uniformity can be prevented.

Modification

The present invention is not limited to the respective embodiments as described above, and various modifications and changes are possible. These modifications and changes are within the scope of the present invention.

(1) In the respective embodiments, the lenticular lens sheet 14-1 and the lenticular lens sheet 14-2 respectively have the unit lenses 141-1 of one type and the unit lenses 141-2 of the same type, which are arranged in parallel on the light emergent sides of the lenticular lens sheets 14-1 and 14-2. However, not limited thereto, unit lenses of various types may be arranged in combination on the light emergent sides, for example.

(2) In the respective embodiments, due to the shape(s) of the unit lenses 141-1 and 141-2, the lenticular lens sheets 14-1 and 14-2 can totally reflect a part of light vertically incident thereon to return the same. However, not limited thereto, when a desired reflectivity cannot be obtained only by the shape(s) of the unit lens, particles having a reflection effect may be added, and/or a surface of the unit lens may be covered with particles having a reflection effect, for example.

(3) In the respective embodiments, the surface light source device is formed by combining the lenticular lens sheets 14-1 and 14-2, and the reflective polarization sheet 15. However, not limited thereto, the reflective polarization sheet 15 may be omitted, and/or other kinds of optical sheets may be added and combined to form a surface light source device, for example.

(4) In the respective embodiments, the light-emitting sources are arranged at equal intervals therebetween both in the horizontal direction and in the vertical direction. However, not limited thereto, the horizontal interval may be increased, for example. In this case, the corresponding second lenticular lens sheet 14-2 may differ from the lenticular lens sheet 14-1 in shape and/or dimension.

The invention claimed is:

1. A surface light source device comprising:
   a light source unit structured by arranging a plurality of light-emitting sources that are substantially point light sources in a two-dimensional direction; and
   a lenticular lens sheet structured by arranging a plurality of unit lenses of one type or of various types, each of which is a part of a substantially elliptic cylinder, such that lens surfaces of the unit lenses face a light emergent side, wherein adjacent unit lenses are separated by flat troughs;
   wherein, when an interval at which the light-emitting sources are arranged in the same direction as an arrangement direction of the unit lenses of the lenticular lens sheet is defined as L, an interval between the light emitting sources and a rear surface of the lenticular lens sheet is defined as d, a unit-lens end-portion angle, which is an angle between (i) a tangent line that intersects a boundary between the unit lens and an adjacent flat trough and extends along a portion of the lens surface of the unit lens and (ii) a normal line of the lenticular lens sheet that intersects said tangent line, is defined as θ, a refractive index of a material forming the unit lenses of the lenticular lens sheet is defined as n, and a refractive angle at which a light ray emitted from a light-emitting source is refracted by a rear surface of the lenticular lens sheet, relative to a line normal to the rear surface of the lenticular lens sheet is defined as $\phi$,
   and wherein relationships of:

$$\cos^{-1}(n \times \cos(\phi+\theta)) \leq \theta; \text{ and}$$

$$\phi = \sin^{-1}(\sin(\tan^{-1}(L/2d))/n); \text{ or}$$

relationships of:

$$n \times \cos(\phi+\theta) > 1; \text{ and}$$

$$\phi = \sin^{-1}(\sin(\tan^{-1}(L/2d))/n);$$

are satisfied.

2. The surface light source device according to claim 1, further comprising a second lenticular lens sheet structured by arranging a plurality of unit lenses of one type or of various types, each of which is a part of a substantially elliptic cylinder, such that convex surfaces of the unit lenses face the light emergent side, wherein adjacent unit lenses are separated by flat troughs,

- wherein the second lenticular lens sheet is disposed on the lenticular lens sheet in a stacking manner,
- an arrangement direction in which the unit lenses of the second lenticular lens sheet are arranged is perpendicular to the arrangement direction in which the unit lenses of the lenticular lens sheet are arranged, and
- when an interval at which the light-emitting sources are arranged in the same direction as the arrangement direction of the unit lenses of the second lenticular lens sheet is defined as L', an interval between the light emitting sources and a rear surface of the second lenticular lens sheet is defined as d', a unit-lens end-portion angle that is an angle between (i) a tangent line that intersects a boundary between the unit lens and an adjacent flat trough and extends along a portion of the lens surface of the unit lens and (ii) a normal line of the second lenticular lens sheet that intersects said tangent line, is defined as θ', a refractive index of a material forming the unit lenses of the second lenticular lens sheet is defined as n', and a refractive angle at which the light ray emitted from the light-emitting source is refracted by a rear surface of the second lenticular lens sheet, relative to a line normal to the rear surface of the second lenticular lens sheet is defined as φ', and wherein relationships of:

$\cos^{-1}(n' \times \cos(\phi' + \theta')) \leq \theta'$; and $\phi' = \sin^{-1}(\sin(\tan^{-1}(L'/2d'))/n')$; or relationships of:

$n' \times \cos(\phi' + \theta') > 1$; and $\phi' = \sin^{-1}(\sin(\tan^{-1}(L'/2d'))/n')$;

are satisfied.

3. The surface light source device according to claim 1, wherein the light source unit is structured by arranging a plurality of light-emitting sources of various types, which are substantially point light sources of different luminescent colors, in a two-dimensional direction in a predetermined order, and when a largest interval out of intervals at which the light-emitting sources of the same type are arranged, in the same direction as the arrangement direction of the unit lenses of the lenticular lens sheet is defined as $L_c$, and wherein relationships of:

$\cos^{-1}(n \times \cos(\phi + \theta)) \leq \theta$; and $\phi = \sin^{-1}(\sin(\tan^{-1}(L_c/2d))/n)$; or relationships of:

$n \times \cos(\phi + \theta) > 1$; and $\phi = \sin^{-1}(\sin(\tan^{-1}(L_c/2d))/n)$;

are satisfied.

4. The surface light source device according to claim 1, wherein
the light-emitting sources are light-emitting diodes.

5. The surface light source device according to claim 1, wherein
a reflective layer having a diffusion function is formed in the light source unit at least at a position of the intervals between the light-emitting sources.

6. The surface light source device according to claim 1, wherein
a reflectivity with respect to light vertically incident on the lenticular lens sheet is not less than 40%.

7. The surface light source device according to claim 1, wherein
particles having a reflection effect is added to the lenticular lens sheet.

8. The surface light source device according to claim 1, wherein
the lens surface of the lenticular lens sheet is covered with particles having a reflection effect.

* * * * *